Sept. 13, 1955     E. L. SCHNOEBELEN     2,717,640
TIRE TRUER
Filed Dec. 22, 1953     5 Sheets-Sheet 1
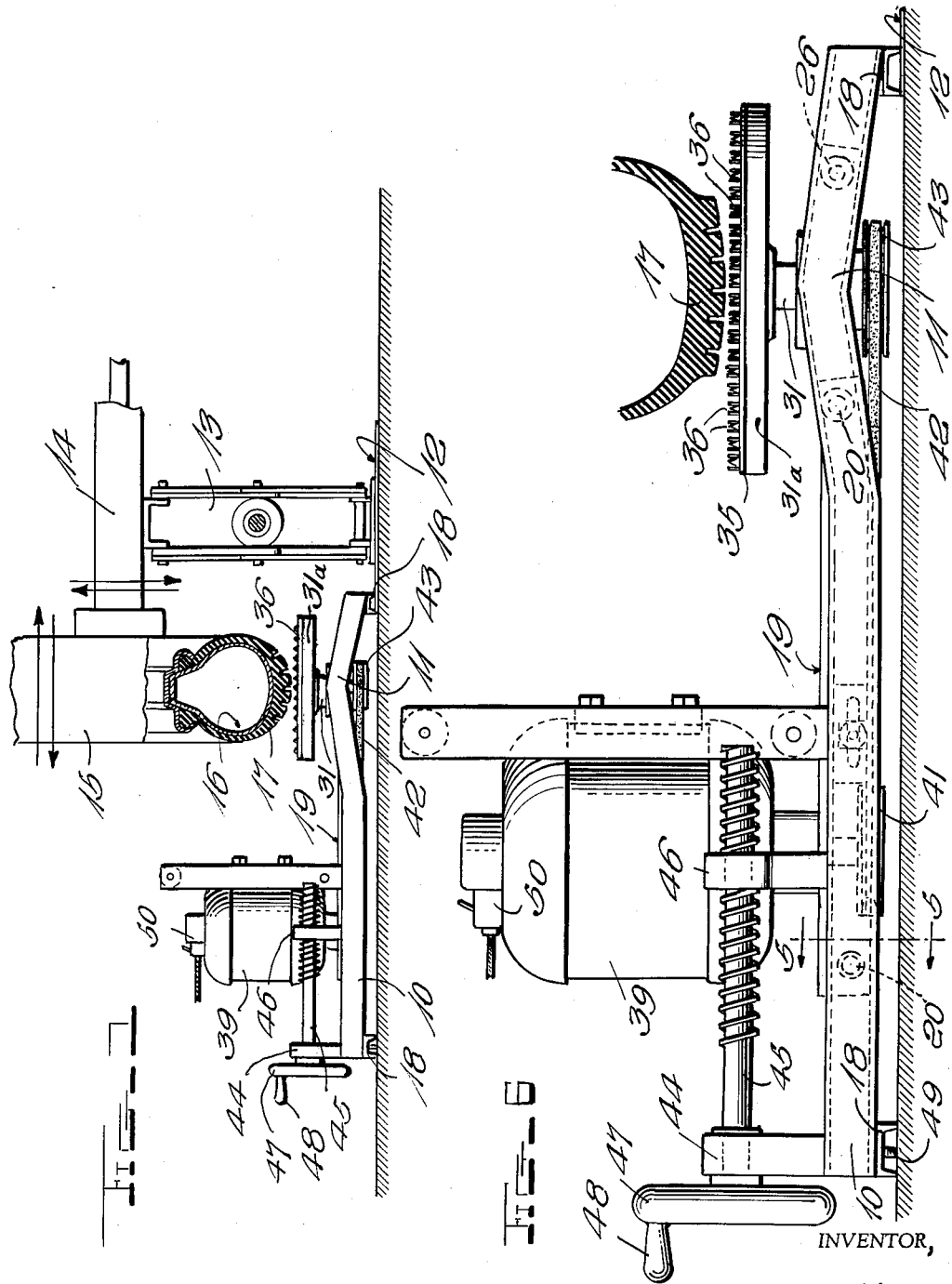
INVENTOR,
EARL L. SCHNOEBELEN,
BY *E. E. Vrooman & Co.*,
ATTORNEYS.

Sept. 13, 1955                E. L. SCHNOEBELEN                2,717,640
                                  TIRE TRUER
Filed Dec. 22, 1953                                           5 Sheets-Sheet 2
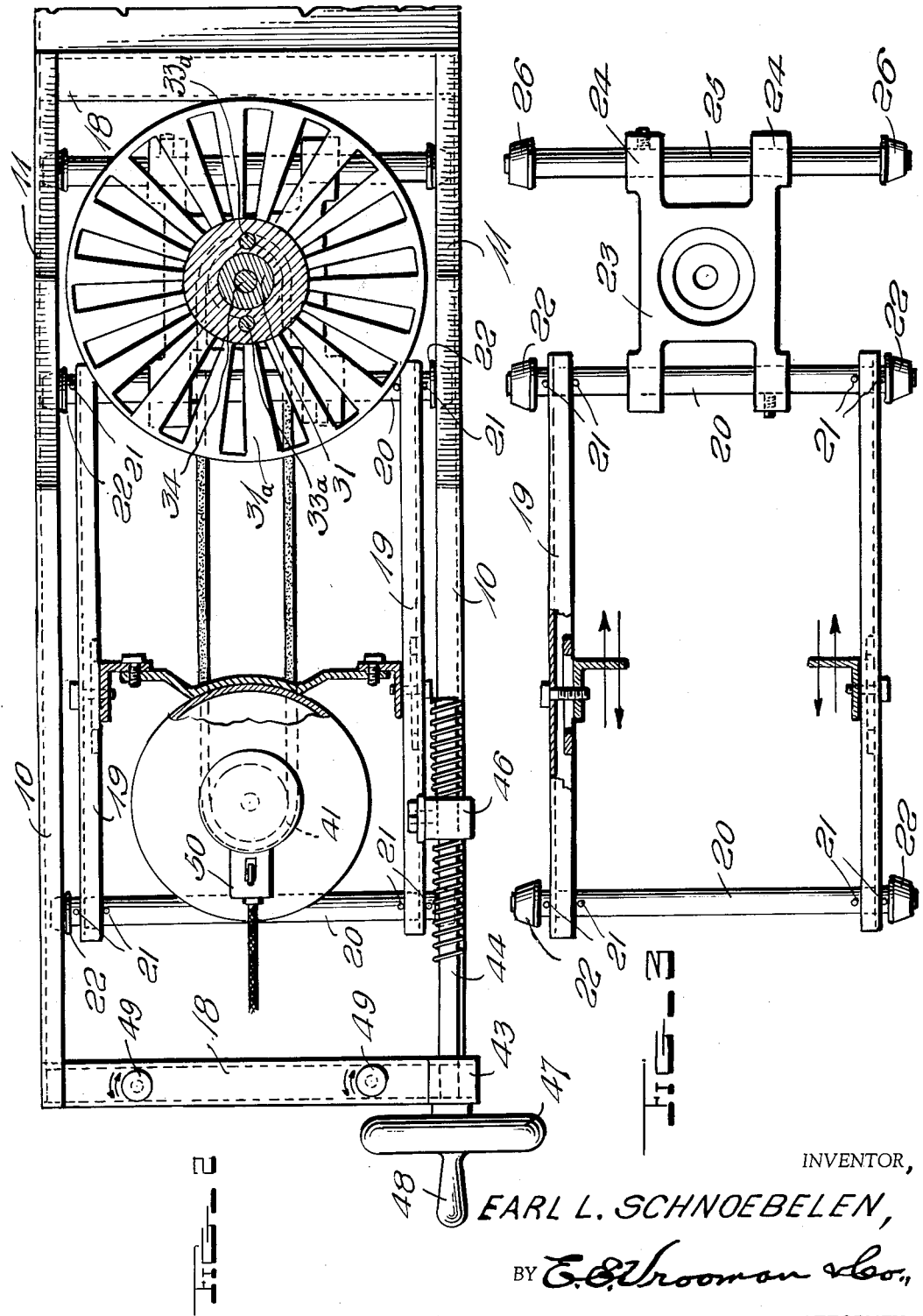
INVENTOR,
EARL L. SCHNOEBELEN,
BY
ATTORNEYS

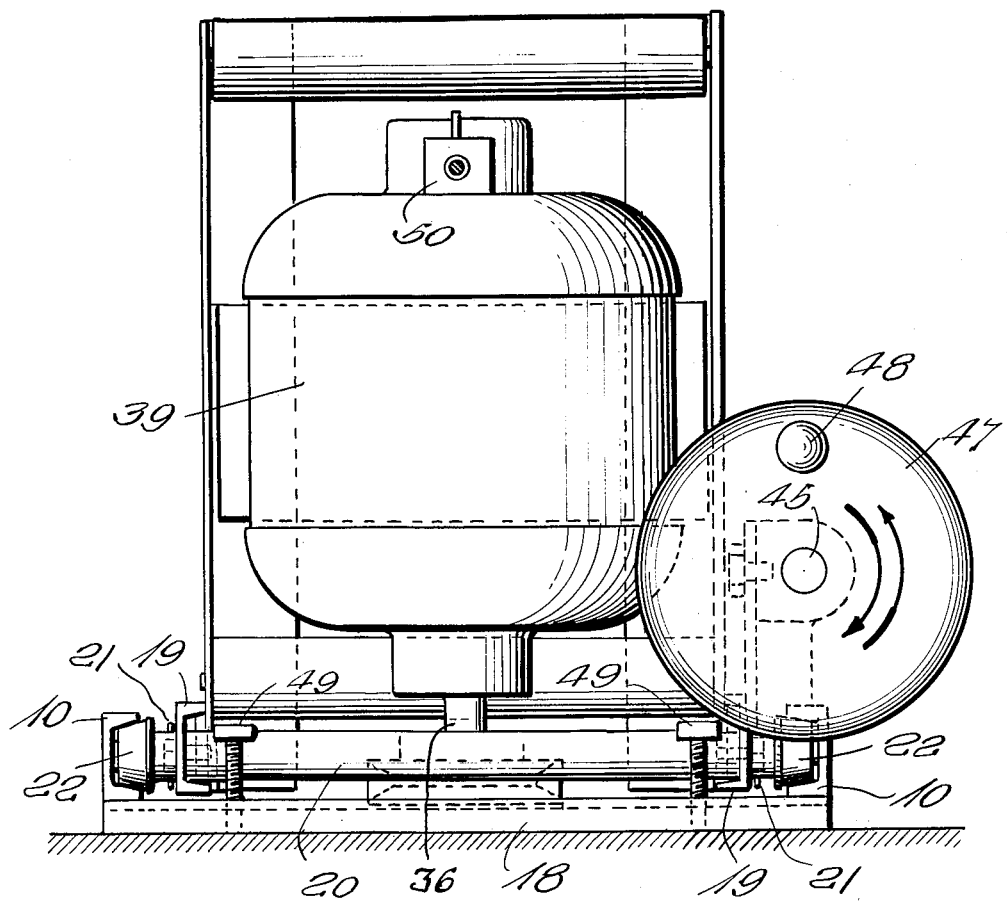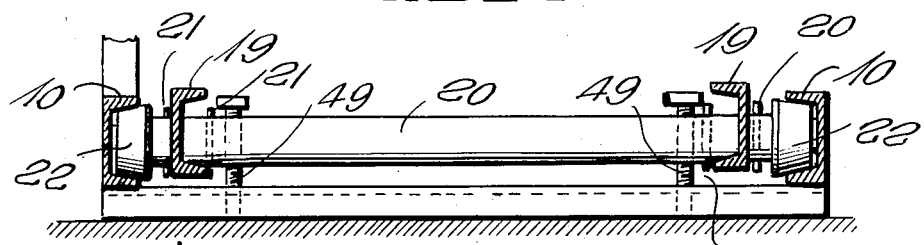

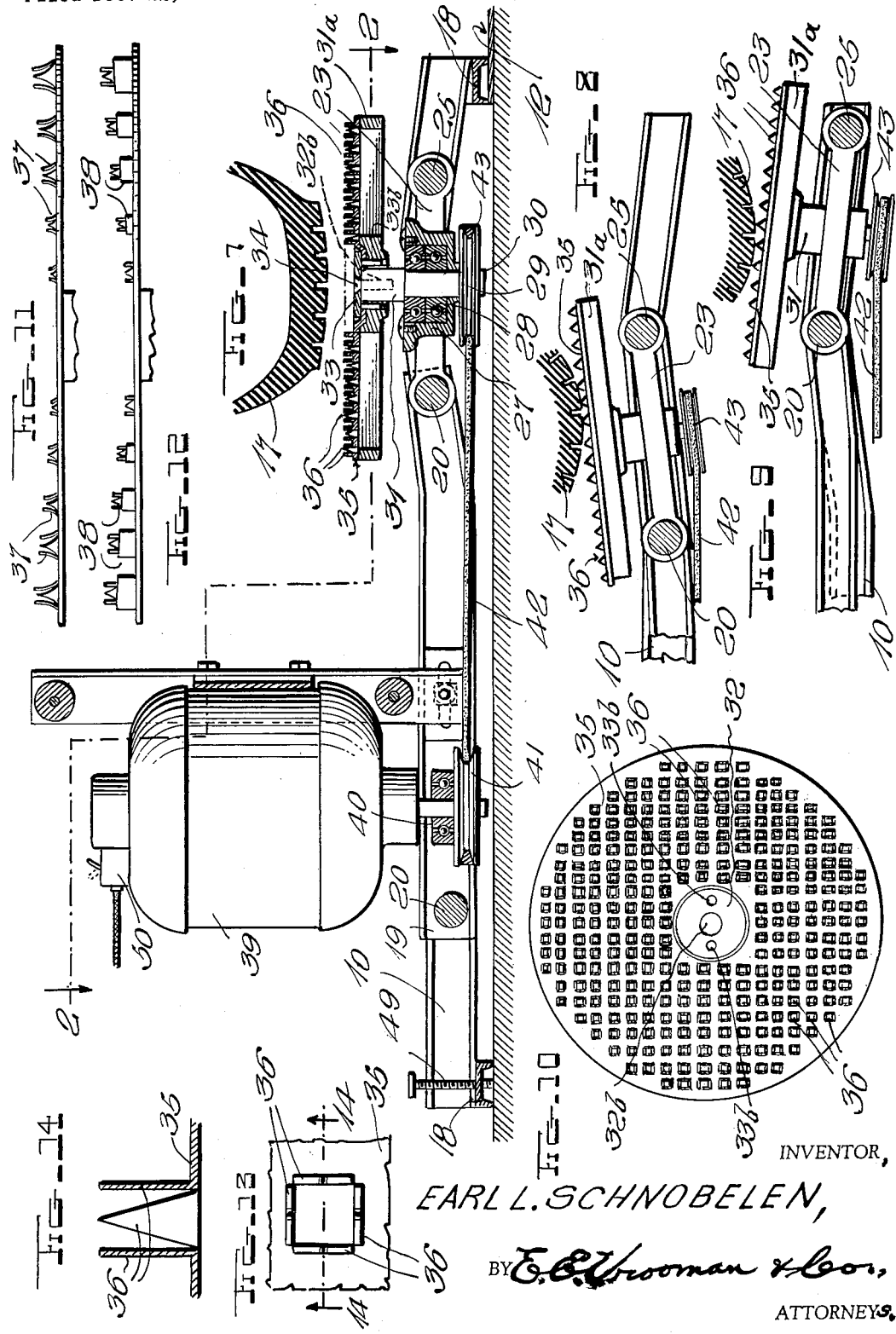

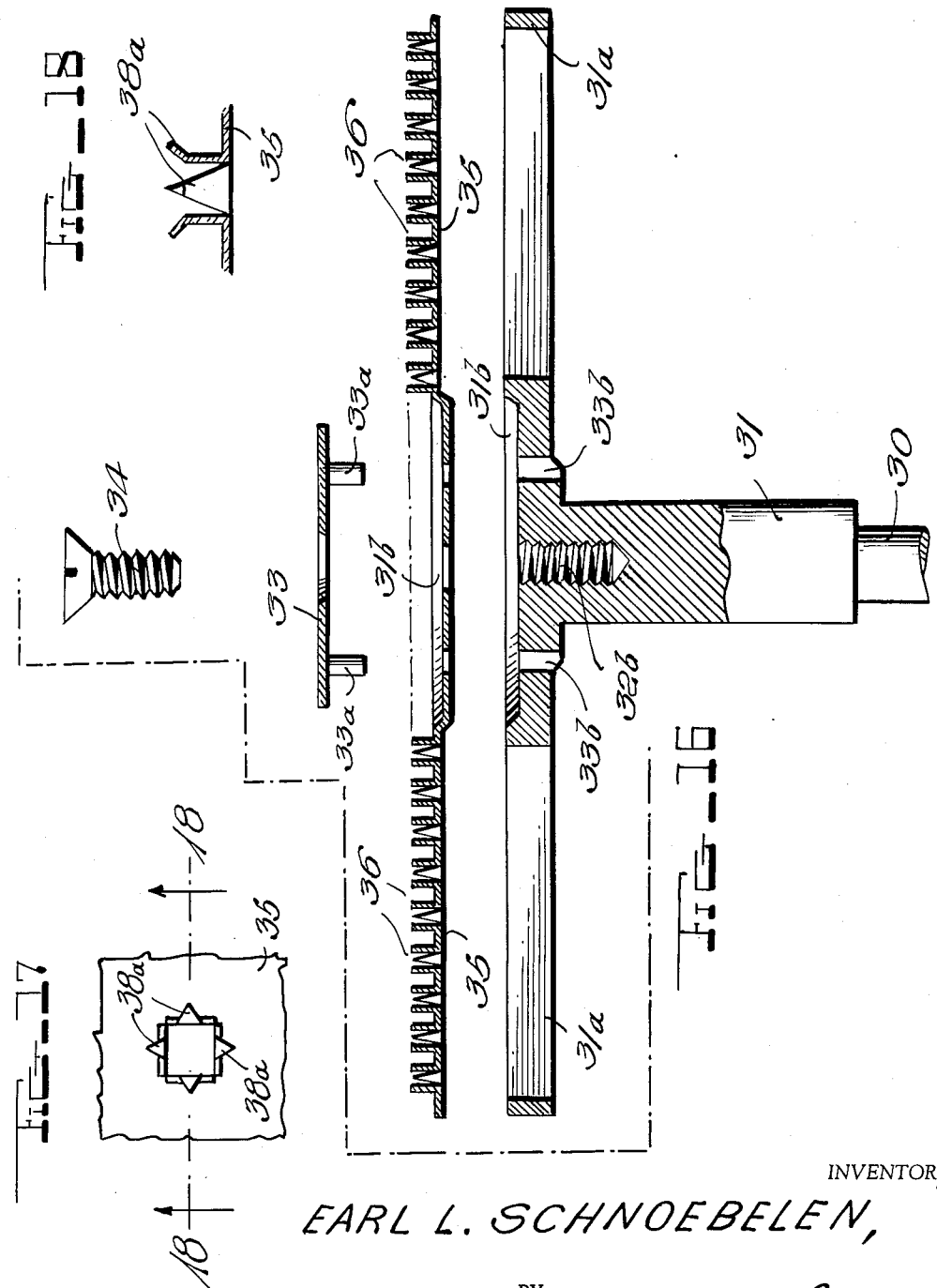

United States Patent Office 2,717,640
Patented Sept. 13, 1955

2,717,640

TIRE TRUER

Earl L. Schnoebelen, Rock Island, Ill., assignor to Bear Manufacturing Company, Rock Island, Ill., a corporation of Delaware Application December 22, 1953, Serial No. 399,729

13 Claims. (Cl. 164—10.2)

This invention relates to a dressing device for automobile tires.

When the shoe of a tire is put on an automobile wheel it frequently happens that the cross-section of the ground contacting portion of such a tire in one position of the tire will be proper for such contact. As the tire is rotated this ground contacting portion may not have the same distribution of support against the roadway as in the other part of the tire. Thus, the tire as it rotates has its supporting portion shifted laterally from one side to the other.

The present invention further relates to a device for so shaping the ground contact portion of a tire that throughout the entire rotation of the tire the pressures on such ground contacting portion will be uniform.

One important object of the invention is to provide a device of this character which will ensure uniformly shaped ground contacting face in an automobile tire.

A second important object of the invention is to provide a device of this character which will properly shape the ground contacting face of a tire which has been distorted while mounting on the wheel of an automobile.

A third important object of the invention is to provide novel means for accomplishing the foregoing purposes after the wheel is mounted on an automobile.

A fourth important object of the invention is to provide a device of this character which will ensure that a wheel rotating under an automobile will have uniformly constant contact with the road surface.

A fifth important object of the invention is to provide novel means whereby any irregularities in the arcuate ground contacting face of an automobile tire may be removed and the tire so dressed as to make all parts in the circumference of the ground contacting surface of the tire uniform in their contact efficiency.

A sixth important object of the invention is to provide means for so dressing an automobile tire when in position on the wheel of an automobile that wear due to irregularities in the ground contacting surface will be prevented.

With the above and other objects in view, as will be hereinafter apparent, the invention consists in general of certain novel details of elements and combinations of parts hereinafter fully described, illustrated in the accompanying drawings, and particularly claimed.

In the accompanying drawings like characters of references indicate like parts in the several views, and:

Fig. 1 is a side elevation of the complete invention, a section through an automobile tire being shown in relation thereto.

Fig. 2 is a horizontal section on line 2—2 of Fig. 7.

Fig. 3 is a plan view of a certain sliding frame used in this invention.

Fig. 4 is a rear elevation of the invention.

Fig. 5 is a section on the line 5—5 of Fig. 2.

Fig. 6 shows an enlarged side elevation.

Fig. 7 is a vertical longitudinal section through the rear portion of the invention and showing the mounting of the abrasion member and its drive.

Fig. 8 is a detail showing the abrasion member in one extreme position of tilt.

Fig. 9 is a view similar to Fig. 8 by showing the abrasion member in the opposite extreme position of tilt.

Fig. 10 is a plan view of one type of abrasion member.

Fig. 11 is a diametric view of one type of abrasion member.

Fig. 12 is a similar view showing a modification of the type shown in Fig. 11.

Fig. 13 is a detailed section on the line 13—13 of Fig. 7.

Fig. 14 is a section of line 14—14 of Fig. 13.

Fig. 15 is a diagram of the relationship of the wheel center and the disc center used herein.

Fig. 16 is an exploded view of the means for securing the cutter disc and support to a rotary shaft used herewith.

Fig. 17 is an enlarged detailed view of a preferred arrangement of cutters on the cutter disc.

Fig. 18 is a section on the line 18—18 of Fig. 17.

In the embodiment of the invention shown in the present drawings there is provided a main frame having parallel side members 10 preferably of confronting channel shape. These side members are bowed upwardly at portions 11 opposite each other. Extending forwardly of the main frame is a platform 12 whereon may be maintained when desiring a jack indicated in general at 13. This jack is intended, when in use, to engage an axle of a wheel such as is shown at 14 in Fig. 1 and it carries a wheel center 15 provided with the usual tire having an inner tube 16 and a shoe 17. The main frame has its side members 10 securely spaced in position by transverse members 18 at the front and rear ends thereof.

In this connection there is also provided a rectangular auxiliary frame having side members 19 which are held in spaced relation by crossed members 20. These crossed members are in the form of rotary shafts and extend through the side members 19 being held by suitable pins 21 from movement through said side members. On the ends of these shafts 20 are maintained frusto-conical rollers 22 which fit in the channels of the main frame and thus enable this auxiliary frame to be moved to and fro in the main frame. On the forward transverse member 20 of the auxiliary frame there is fixedly mounted a journal housing indicated in general at 23 and this journal housing has forwardly extending arms 24 which likewise are fixed on a transverse axle 25 carrying frusto-conical wheels 26 at its ends, the latter engaging in the channels.

Now the normal position of the center of the housing 23 is exactly over the highest portion of the upwardly bowed parts 11 as best shown in Fig. 1. This portion 23 of the device has a centrally disposed cylindrical housing 27 wherein is mounted a lower set of ball bearings 28 and an upward set of ball bearings 29. In these ball bearings is a journal shaft 30 which carries a hub 31 suitably keyed thereto. The hub 31 has fixed thereto a disc support plate 31a having a shallow centrally disposed recess 31b from which a downwardly extending threaded bore 32b passes axially into the hub 31. At 35 is provided an abrasion member or cutter disc carrying abrasion prongs 36. This cutter disc has a depressed central portion 32 formed to fit in the recess 31b. Fitting into this depressed portion is a holding disc 33 having pins 33a arranged to extend downwardly into sockets 33b formed in the head of the member 31. The disc 33 is provided with a central bevelled edge opening 33c. A frusto conical bevel headed bolt 34 passes down through the opening 33c and into the threaded socket 32b to secure all of these parts firmly together. The prongs 36 may be of uniform conical shape as shown in Fig. 11 and varying height increasingly from the center of the member 35 outwardly. In Fig. 12 a modification is illustrated wherein the prongs 38 while still graduated outwardly have a heavy base portion and only minor cutting portions. A form 38a of these prongs is shown in Fig. 17, wherein it will be noted that the points of the prongs extend outwardly and thus are enabled to better cut into the tire.

Mounted on the auxiliary frame is a motor 39 having a shaft 38. On the lower end of this shaft is carried a belt pulley 41 which is connected by a belt 42, with a belt pulley 43 on the shaft 30. Thus when the motor is in operation the abrasion member is constantly rotating. This is true whether or not the shaft 30 is tilted in one direction or another. While Figs. 8 and 9 show a very considerable tilt to the shaft 30, yet there is not tilt in actual construction to cause disengagement of the belt from the pulley 42. These Figs. 8 and 9 are somewhat exaggerated to tilt, in order to more clearly bring out the operation of the device.

On the main frame, at one side thereof is fixed a bearing 43, whereon is journalled a shaft 44. On the auxiliary frame is mounted a nut 46, through which the threaded shaft 44 extends. At the rear end of the device there is mounted on the shaft 44 a wheel 47 having an operating handle 48. Now by rotating wheel 47 and shaft 44, the auxiliary frame is traversed from front to back and carries with it the frame 23, so that the abrasion member is traversed from one side to the other of the tire under treatment.

In order to regulate the relation of the main frame and parts carried thereby to the horizontal, there is provided at the rear end of the main frame a pair of jack screws 49, which extend through the base member 18 and thus enable, by their rotation, the rear end of the frame to be raised and lowered.

In the operation of the invention this device is shifted laterally of the automobile into position, for the wheel to be treated may be rotated transverse the axis of the present invention and directly over the abrasion plate. The axle carrying the wheel to be treated is raised upwardly by engagement of the jack 13, with the axle of this wheel as clearly shown in Fig. 1. The jack 13 is adjusted so that the wheel is brought into proper position to be acted on by the abrasion member when the axis of the latter is in vertical position with the axial line intersecting the axial line of the wheel shaft. Then the motor is started in operation and by manipulating the handwheel 47 the shaft 44 is rotated first in one direction and then in the other, so that the member 23 rides to and fro over the raised portion of the main frame and thus causes tilting first in one direction and then in the other. Meanwhile, the rapid rotation of the abrasion cuts off unequal or protruding portions of the wheel shoe, and thus establishes a perfection of ground engaging surface transverse the wheel shoe. Obviously, this causes smooth riding and prevents unequal air on the wheel shoe caused by bumping action of parts not in perfect ground contacting formation.

It is to be noted that the motor 39 is provided with a controlling switch 50.

What is claimed is:

1. In a tire dressing device, an elongated main base frame, an auxiliary frame reciprocally mounted on said main frame, a rotatable abrasion disc mounted on the forward end of the auxiliary frame, means to reciprocate the auxiliary frame, means to rotate said disc, and cooperative means on the main and auxiliary frames causing tilting oscillation of said disc during reciprocation of said auxiliary frame.

2. In a tire dressing device, an elongated main base frame, an auxiliary frame reciprocally mounted on said main frame, a rotatable abrasion disc mounted on the forward end of the auxiliary frame, means to reciprocate the auxiliary frame, means to rotate said disc, cooperative means on the main and auxiliary frames causing tilting oscillation of said disc during reciprocation of said auxiliary frame and a jack supporting plate fixed to and projecting forwardly from the forward end of the main frame.

3. In a tire dressing device, an elongated main base frame, an auxiliary frame reciprocally mounted on said main frame a rotatable abrasion disc mounted on the forward end of the auxiliary frame, means to reciprocate the auxiliary frame, means to rotate said disk, and cooperative means on the main and auxiliary frames causing tilting oscillation of said disc during reciprocation of said auxiliary frame and ground engaging jack means at the rear end of the main frame effecting and controlling bodily tilt of said device.

4. In a tire dressing device, an elongated main base frame, an auxiliary frame reciprocally mounted on said main frame a rotatable abrasion disc mounted on the forward end of the auxiliary frame, means to reciprocate the auxiliary frame, means to rotate said disk, cooperative means on the main and auxiliary frames causing tilting oscillation of said disc during reciprocation of said auxiliary frame and a jack supporting plate fixed to and projecting forward from the forward end of the main frame and ground engaging jack means at the rear end of the main frame effecting and controlling bodily tilt of said device.

5. In a tire dressing device, and elongated main base frame, an auxiliary frame reciprocally mounted on said main frame and comprising a rear section and a front section hinged to the rear section, a rotatable abrasion disc mounted on said front section, means to reciprocate the auxiliary frame, a motor on said rear section operatively connected to the disc, and cooperative means on the main and auxiliary frames causing tilting oscillation of said disc during reciprocation of said auxiliary frame.

6. In a tire dressing device, and elongated main base frame, an auxiliary frame reciprocally mounted on said main frame and comprising a rear section and a front section hinged to the rear section, a rotatable abrasion disc mounted on said front section, means to reciprocate the auxiliary frame, a motor on said rear section operatively connected to the disc, cooperative means on the main and auxiliary frames causing tilting oscillation of said disc during reciprocation of said auxiliary frame, and a jack supporting plate fixed to and projecting forwardly from the forward end of the main frame.

7. In a tire dressing device, an elongated main base frame, an auxiliary frame reciprocally mounted on said main frame and comprising a rear section and a front section hinged to the rear section, a rotatable abrasion disc mounted on said front section, means to reciprocate the auxiliary frame, a motor on said rear section operatively connected to the disc, and ground engaging jack means at the rear end of the main frame effecting and controlling bodily tilt of said device.

8. In a tire dressing device, and elongated main base frame, an auxiliary frame reciprocally mounted on said main frame and comprising a rear section and a front section hinged to the rear section, a rotatable abrasion disc mounted on said front section, means to reciprocate the auxiliary frame, a motor on said rear section operatively connected to the disc, cooperative means on the main and auxiliary frames causing tilting oscillation of said disc during reciprocation of said auxiliary frame, and ground engaging jack means at the rear end of the main frame effecting and controlling bodily tilt of said device.

9. In a tire dressing device, an elongated main base frame, an auxiliary frame reciprocally mounted on said main frame and comprising a rear section and a front section hinged to the rear section, a rotatable abrasion disc mounted on said front section, means to reciprocate the auxiliary frame, a motor on said rear section operatively connected to the disc, a jack supporting plate fixed to and projecting forwardly from the forward end of the main frame and ground engaging jack means at the rear end of the main frame effecting and controlling bodily tilt of said device.

10. In a tire dressing device, and elongated main base frame, an auxiliary frame reciprocally mounted on said main frame and comprising a rear section and a front section hinged to the rear section, a rotatable abrasion disc mounted on said front section, means to reciprocate the auxiliary frame, a motor on said rear section operatively connected to the disc, cooperative means on the main and auxiliary frames causing tilting oscillation of said disc during reciprocation of said auxiliary frame, a jack supporting plate fixed to and projecting forwardly from the forward end of the main frame, and ground engaging jack means at the rear end of the main frame effecting and controlling bodily tilt of said device.

11. In a device of the kind described, a rectangular base frame having side members constituting guides, said side members being provided adjacent their front ends with oppositely disposed upwardly bowed portions, a shiftable frame mounted between and guided by the guides, an abrasion disk having a shaft journalled in said shiftable frame, driving means carried by the shiftable frame and operatively connected to said shaft, and means to reciprocably shift said shiftable frame.

12. In a device of the kind described, abrasion disc rotating means comprising a vertical driven shaft, a hub fixed on said shaft, a disc supporting plate fixed integrally on the upper end of said hub, said plate having a shallow, central recess on its upper face and having a downwardly extending bolt-receiving socket and a plurality of pin sockets spaced radially from the first mentioned socket, a cutter disc resting on said plate and having a downwardly offset portion fitting in said recess, said cutter plate being provided with a central opening, a disc holding washer fitted in the recess of said plate and provided with pins extending into the pin openings and having a central bolt receiving opening, and a bolt receiving opening extending downwardly through the washer and the disc plate and into the bolt receiving opening, said cutter disc being provided with upstanding cutter prongs.

13. In a device of the kind described, abrasion disc rotating means comprising a vertical driven shaft, a hub fixed on said shaft, a disc supporting plate fixed integrally on the upper end of said hub, said plate having a shallow, central recess on its upper face and having a downwardly extending bolt-receiving socket and a plurality of pin sockets spaced radially from the first-mentioned socket, a cutter disc resting on said plate and having a downwardly offset portion fitting in said recess, said cutter plate being provided with a central opening a disc holding washer fitted in the recess of said plate and provided with pins extending into the pin openings and having a central bolt receiving opening, and a bolt receiving opening extending downward through the washer and the disc plate and into the bolt receiving opening, said cutter disc being provided with upstanding cutter prongs, said prongs having oppositely disposed and outwardly flaring points.

References Cited in the file of this patent

UNITED STATES PATENTS

| 1,762,453 | Perrault et al. | June 10, 1930 |
| 2,294,047 | Pollock | Aug. 25, 1942 |
| 2,610,446 | Hawkinson | Sept. 16, 1952 |